Jan. 26, 1965  J. MICHALSKI  3,167,086
FLUID MIXING VALVE ASSEMBLY
Filed July 25, 1962  2 Sheets-Sheet 1

Janusz Michalski
INVENTOR.

BY *Thomas A. O'Brien*
*and Harvey B. Jacobson*
Attorneys

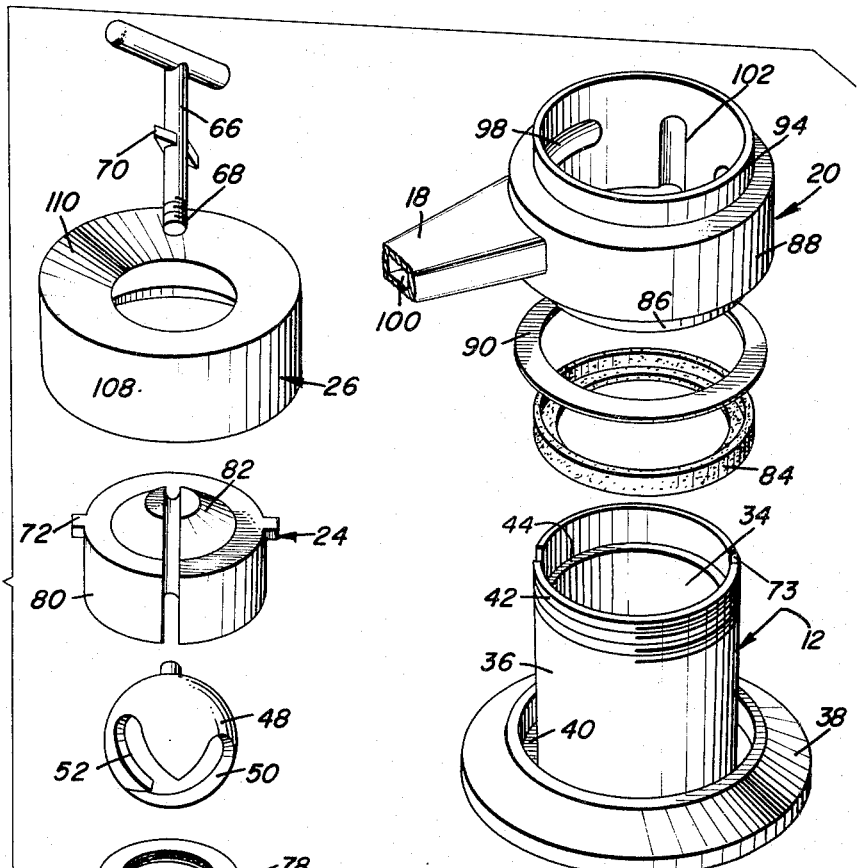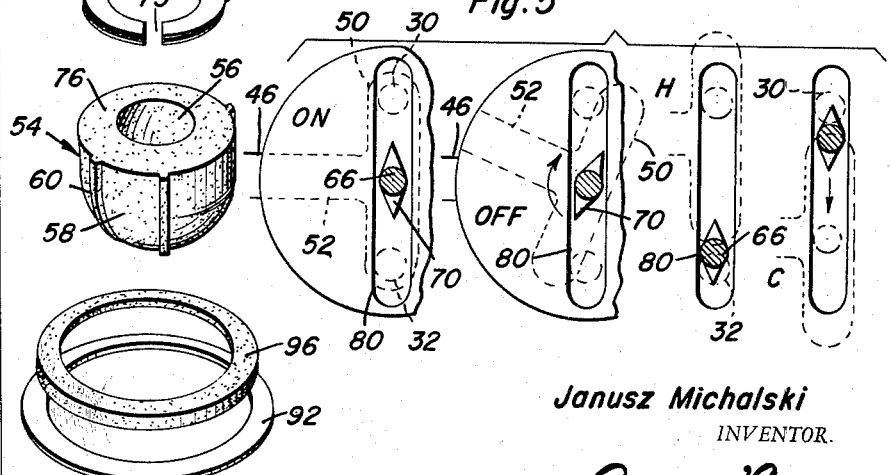

United States Patent Office 3,167,086
Patented Jan. 26, 1965

3,167,086
FLUID MIXING VALVE ASSEMBLY
Janusz Michalski, 2033 W. Le Moyne, Chicago, Ill.
Filed July 25, 1962, Ser. No. 212,373
9 Claims. (Cl. 137—315)

This invention relates to a mixing valve assembly of a new and useful construction.

One of the most important objects of the present invention is to provide a plumbing fixture of the type referred to which is simple to operate, manufacture, install and repair.

Another object of the present invention in accordance with the foregoing object is to provide a mixing valve assembly the major components of which may be removed for repair purposes independently of each other so as to avoid complete disassembly of the valve assembly.

A further object of the present invention is to provide a mixing valve assembly, a portion of which may be disassembled for repair or replacement purposes without cutting off the water pressure in view of its ability to maintain controlled discharge of fluid in a partially disassembled condition.

An additional object of the present invention is to provide a mixing valve assembly the parts of which may be manufactured with greater economy and with less precision machining. Further, the valve assembly employs a minimum number of parts capable of being assembled and disassembled with greater facility.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of the various parts of the valve assembly shown in disassembled condition.

FIGURE 5 is a phase diagram of the various operative conditions of the mixing valve assemblies.

Figure 2:
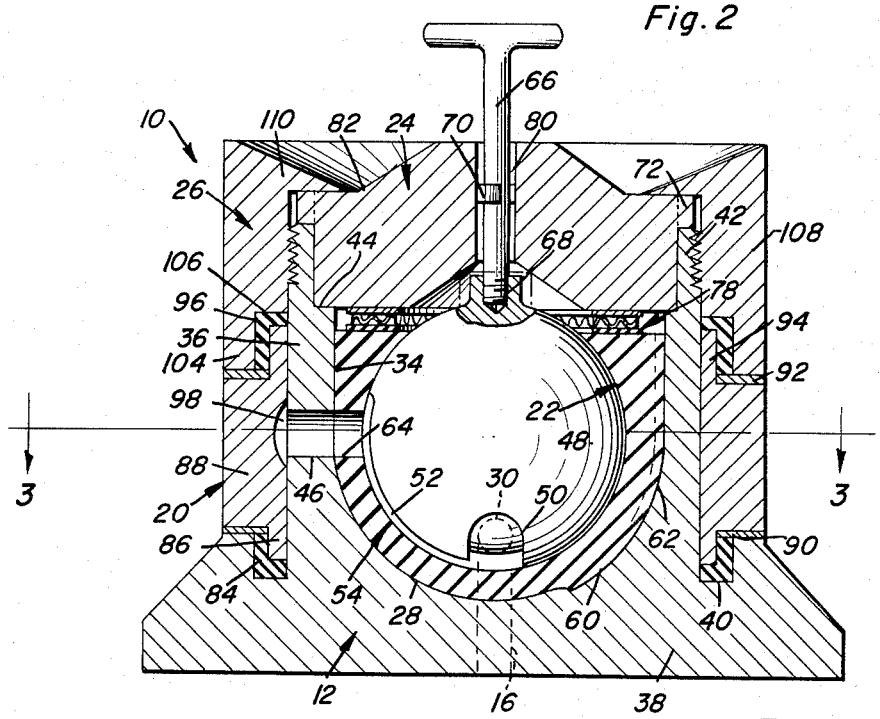
FIGURE 2 is a sectional view of the valve assembly taken substantially through a plane indicated by section line 2—2 in FIGURE 1.
Figure 3:
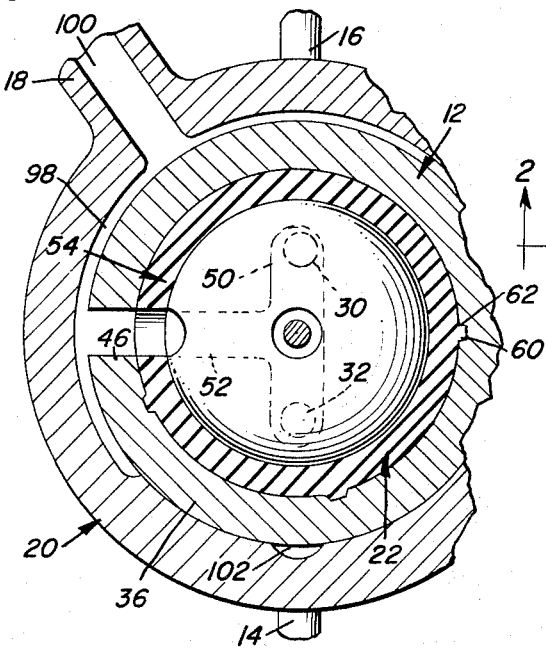
FIGURE 3 is a partial sectional view of the valve assembly taken through a plane indicated by section line 3—3 in FIGURE 2.

Referring now to the drawings in detail, it will be observed that the mixing valve assembly generally referred to by reference numeral 10 includes a valve body 12 to which a pair of fluid inlet conduits 14 and 16 are connected as more clearly seen in FIGURES 2 and 3, said inlet conduits for example conducting hot and cold water respectively to be discharged from the spout or outlet portion 18 of a fluid conducting discharge assembly generally referred to by reference numeral 20. The flow of fluid from the inlet conduits 14 and 16 to the spout portion 18 of the discharge assembly, is therefore controlled by means of a mixing valve device generally referred to by reference numeral 22 which is displaceably mounted within the valve body 12.

The mixing valve device 22 and the discharge assembly 20 are maintained in assembled relation respectively on and within the valve body 12 by means of valve assembling devices including a cover member 24 and an assembly nut member 26.

The valve body 12 is adapted to be mounted in any suitable fixed location whereby the inlet conduits 14 and 16 supplying fluid under pressure, may be connected to the valve body, said inlet conduits 14 and 16 communicating with a hemispherical cavity portion 28 through a pair of inlet ports 30 and 32 through which hot and cold water may be respectively introduced. It should be appreciated of course, that other fluids may be supplied and mixed through the valve assembly of the present invention. Contiguous with the hemispherical cavity 28 is a cylindrical valve chamber 34 the upper end of which is open, said cylindrical valve chamber 34 being formed by the upwardly extending annular wall portion 36 of the valve body. The base portion 38 of the valve body is formed with an annular groove 40 for rotatably received therewithin the discharge assembly 20. An upper cylindrical end portion 42 of the valve body is externally threaded and has an enlarged internal diameter as compared to the diameter of the cylindrical chamber 34, so as to form a seating shoulder 44 for the cover member 24. The inlet conduits 14 and 16 therefore communicate with the cavity portion 28 through passages terminating at the inlet ports 30 and 32 as more clearly seen in FIGURE 3, the cylindrical chamber portion 34 being provided with an outlet passage 46.

The mixing valve device 22 which is mounted for limited rotation in two directions within the cavity 28 and valve chamber 34, includes a spherical ball valve element 48 having externally grooved connecting passages 50 and 52 which intersect as more clearly seen in FIGURES 2, 3 and 4. The ball valve element 48 is of a diameter which is less than the diameter of the cavity 28 and cylindrical chamber 34 so that the groove passage 52 will be in spaced alignment with the outlet passage 46 in the valve body for fluid communication therewith while the groove passage 50 will be in spaced selective alignment with the inlet ports 30 and 32. Seated within the cavity 28 and cylindrical valve chamber 34 of the valve body, in enclosing relation to the ball valve element 48 is a sealing shell member 54 made of resilient material such as rubber. The internal surface 56 of the sealing member 54 is spherical in shape for supporting the ball valve element 48 and accommodating rotatable displacement thereof in different directions. The external surface 58 of the resilient sealing member conforms to the surfaces of the cavity 28 and chamber 34 and is provided with a plurality of asymmetrically arranged projecting ribs 60 adapted to be slidably fitted within vertically elongated keyways 62 formed within the cavity portion 28 and chamber portion 34 so as to slidably receive the flexible sealing member 54 in non-rotatable relation to the valve body. The asymmetrical arrangement of the keying ribs 60 also restricts assembly of the flexible sealing member 54 within the valve body to a position wherein an outlet opening 64 will be aligned with the outlet passage 46 in the valve body so that fluid communication may be provided between said inlet ports and the groove passage 50. It will therefore be appreciated that the valve ball element 48 may be assembled and disassembled together with the resilient sealing member 54 by slidable insertion and withdrawal from the cavity and valve chamber. It will also be appreciated that in view of the presence of the enclosing sealing member 54, the surfaces on the valve body forming the cavity 28 and chamber 34 as well as the external surface of the valve element 48 need not be machined with the precision otherwise called for in connection with valve assemblies heretofore utilized. A significant economy in manufacture is thereby effected. In order to assemble and disassemble as well as to selectively displace the ball valve elements 48 in order to control fluid flow, an operating handle 66 is connected thereto by means of any suitable connection as for example the threaded connection 68. Connected to the handle 66 intermediate the opposite ends thereof, are movement limiting projections 70 designed to limit rotational movement of the handle member 66 and ball valve element 48 connected thereto about the longitudinal axis of the handle member. Thus, the projections 70 and the handle member 66 cooperate with the cover member 24 for guiding and limiting displacement of the vall valve elements 48 in order to mix the fluid and connect the mixed fluid with the passages within the discharge assembly 20.

Figure 1:
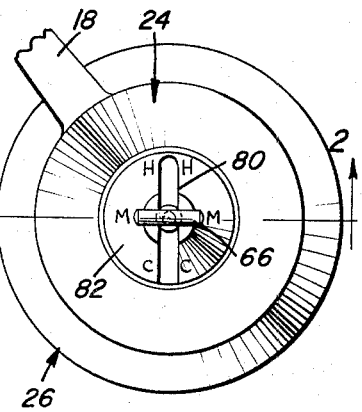
FIGURE 1 is a partial top plan view of the mixing valve assembly of the present invention.

The cover member 24 is provided with a pair of tabs 72 adapted to be seated in recesses 73 in the threaded portion 42 of the valve body while the lower surface of the cover member rests upon the supporting shoulder 44 of the valve body. Disposed between the lower surface 74 of the cover member and the upper end 76 of the resilient sealing member 54, is a pressure sealing ring assembly 78 provided with a slot 75 for alignment with handle 66 and adapted to provide sealing pressure contact between the lower surface 74 of the cover member when assembled and the resilient sealing member 54. Also formed within the cover member 24 is an arcuate slot 80 through which the handle member 66 extends the side walls of the slot 80 being spaced from the handle members 66 so that it may rotate about its longitudinal axis limited by the projection 70 abutting against the side walls of the slot 80. Also, the arcuate slot 80 is opened at one end so as to permit assembly and disassembly of the handle member from the cover member. The upper surface 82 of the cover member may be provided with suitable indicia designating the various operative positions of the handle member 66 with respect to its longitudinal axis and with respect to its position within the slot 80 as more clearly shown in FIGURE 1.

As hereinbefore indicated, the discharge assembly 20 is rotatably mounted on the valve body 12 by means of the annular groove 40 formed therewithin. Accordingly, the pressure sealing ring 84 is seated within the annular groove 40 and is in sealing contact with a lower annular end portion 86 of the discharge assembly 20, the central body portion 88 being spaced from the base portion 38 of the valve body by means of the annular washer element 90. At the opposite axial end of the body portion 88 is a second annular washer element 92 which spaces the discharge assembly 20 from the assembly nut member 26 which is in pressure sealing engagement with the upper portion 94 by means of a sealing ring 96 made of resilient material such as rubber similar to that of the sealing ring 84. Formed internally of the body portion 88 of the discharge assembly 20, is an arcuately elongated discharge passage 98 extending preferably 270 degrees. The discharge passage 98 therefore provides fluid communication between the outlet passage 46 in the valve body and the spout passage 100 within the spout portion 18 for a plurality of different rotatable positions of the discharge assembly 20 with respect to the valve body. Circumferentially spaced from the spout passage 100 and from the ends of the discharge passage 98, is a vertically extending passage 102 as more clearly seen in FIGURES 3 and 4, the passage 102 terminating at its upper end within the body portion 88 of the discharge assembly and extending completely through the lower portion 86 of the discharge assembly. It will therefore be appreciated, that when the discharge passage 102 is aligned with the outlet passage 46 in the valve body, fluid flow will be conducted downwardly from the discharge assembly 20 so as to gradually and controllably direct the flow of fluid as the discharge assembly is being slidably removed upwardly from the valve body. The discharge assembly is however maintained in pressure sealed assembled relation on the valve body by engagement of the assembling nut member 26 with the pressure sealing ring member 96 and washer element 92.

The assembling nut member 26 therefore includes a lower portion 104 of enlarged internal diameter so as to form an assembling shoulder 106 for engagement with the pressure sealing ring member 96. The central body portion 106 of the assembly member 26 is internally threaded for threaded mounting on the upper end portion 42 of the valve body. The upper flange portion 110 of the assembly nut member 26 extends radially inward for engagement with the upper flange portion 72 of the cover member 24 in order to hold it in assembled position at the same time that the discharge assembly 20 is independently maintained in assembled position.

From the foregoing description, the operation and utility of the mixing valve assembly of the present invention will be apparent. It will therefore be appreciated, that the valve assembly may be operated by a single hand of the user. Referring therefore to FIGURE 5 in particular, it will be observed that when the handle member 66 is rotatably positioned with respect to its longitudinal axis so that the projections 70 thereon are aligned with the slot 80, the connecting groove passage 52 on the ball valve element 48 will communicate with the outlet passage 46 in the valve body so as to conduct fluid flow from the inlet ports 30 and 32 should they be both aligned and in communication with the connecting groove 50 as shown in the left hand diagram of FIGURE 5. An equal mixture of hot and cold water may thereby be supplied to the spout passage within the discharge assembly. When however, the valve handle 66 is rotated about its longitudinal axis limited by the projection 70 abutting the side walls of the slot 80 as illustrated in the second from the left diagram of FIGURE 5, both the connecting passages 50 and 52 will be angularly displaced so that the connecting passage 52 is no longer aligned with the outlet passage 46 thereby shutting off the flow of fluid through the valve assembly. Assuming once again, that the valve handle 66 has been rotatably positioned so as to establish fluid communication between one or more of the inlet ports and the outlet passage 46, angular displacement of the valve handle within the slot 80 in one direction or the other from its central position, may reduce or cut off the flow of fluid from one or the other of the inlet ports 30 and 32 in order to controllably mix the fluid to obtain a desired proportion of hot and cold water or eliminate either the hot or cold water, as shown in the two right hand diagrams of FIGURE 5. The connecting passage 52 will however remain in fluid communication with the outlet passage 46 in the valve body since the outlet passage is substantially at the rotational axis of the ball valve element 48 when it is angularly displaced by the valve handle 66 between the limits of the slot 80. In addition to the simplicity of operation aforementioned, it will be apparent that the valve assembly is made up of a minimum number of parts all of which are easily assembled or removed for repair or replacement purposes. Thus, the resilient sealing member 54 will be installed on the valve element 48 prior to assembly by slidable insertion or removal of the assembled valve ball and resilient sealing member within the cavity and valve chamber of the valve body. The pressure sealing device 78 may then be placed on to of the pressure sealing member 54 and the cover member 24 applied to the open end of the valve chamber. The cover member and valve device 22 when inserted will not fall apart from the valve body so as to facilitate assembly of the other components of the valve assembly. Thereafter, the discharge assembly 20 may be installed about the valve body and then the assembling nut member 26 applied as hereinbefore indicated. When it is desired to repair or replace any of the parts, the fluid pressure need not be cut off. The discharge assembly 20 may simply be rotated so that the discharge passage 102 is aligned with the outlet passage 46 in the valve body and then the discharge assembly slidably removed upwardly after removal of the assembly member 26 should it be desired to replace any of the pressure rings or washers or to replace or repair the discharge assembly itself. Fluid under pressure will then flow in a controlled manner through the outlet passage 46 after being gradually opened through prior communication with the discharge passage 102 by selective positioning of the discharge assembly to its repair position. On the other hand, should replacement of the pressure sealing device 78, or the resilient sealing member 54 be necessary, the mixing valve device 22 may be completely removed after removal of the nut member 26 without disturbing the discharge assembly 20. Repair and maintenance of the mixing valve assembly is thereby facilitated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A plumbing fixture comprising, a valve body having a hemispherical cavity connected to one end of a cylindrical valve chamber having an opposite open end, inlet passages formed in said valve body in communication with said cavity and an outlet passage formed in said valve body in communiaction with said cylindrical chamber, a ball valve of a diameter less than said cavity and chamber disposed in said cavity and chamber and having external intersecting grooves adapted to be selectively aligned with said inlet and outlet passages upon displacement of the ball valve in different directions, said grooves being structurally related to the inlet and outlet passages for establishing fluid communication therewith, a resilient sealing member slidably mounted in non-rotatable relation within said cavity and chamber and enclosing said ball valve, said sealing member having ports therein aligned with the inlet and outlet passages, an outlet member rotatably mounted on the valve body and removable therefrom having internal discharge passages selectively aligned with said outlet passage to conduct fluid discharge during both use and repair, means included in one of said discharge passages when aligned with the outlet passage to deflect flow in a direction generally toward the inlet ports as the outlet member is removed and pressure sealing assembly means mounted on said valve body for imposing sealing pressure on the resilient sealing member and the outlet member.

2. The combination of claim 1, wherein said resilient sealing member comprises a shell made of resilient material having an internal spherical surface for rotatable support of the ball valve and an external surface conforming to said cavity and chamber with keying ribs for non-rotatably seating the sealing member in the cavity and chamber.

3. The combination of claim 2 wherein one of said discharge passages of the outlet member is arcuately elongated for conducting fluid during use, the other of said discharge passages being circumferentially spaced from the spout passage for discharging fluid under pressure during repair by rotatable displacement of the outlet member.

4. The combination of claim 3, wherein said pressure sealing assembly means comprises, cover means slidably seated on the valve body in pressure sealing engagement with the resilient sealing member to close said open end of the valve chamber and limit selective displacement of the ball valve therewithin, and assembly nut means threadedly mounted on said valve body for locking said cover means in pressure sealing engagement to prevent slidable removal of the valve and sealing member from the open end of the valve chamber and independently preventing slidable removal of outlet member from the valve body.

5. The combination of claim 1 wherein one of said discharge passages of the outlet member is arcuately elongated for conducting fluid during use, the other of said discharge passages being circumferentially spaced from the spout passage for discharging fluid under pressure during repair by rotatable displacement of the outlet member.

6. The combination of claim 1, wherein said pressure sealing assembly means comprises, cover means slidably seated on the valve body in pressure sealing engagement with the resilient sealing member to close said open end of the valve chamber and limit selective displacement of the ball valve therewithin, and assembly nut means threadedly mounted on said valve body for locking said cover means in pressure sealing engagement to prevent slidable removal of the ball valve and sealing member from the open end of the valve chamber and independently preventing slidable removal of the outlet member from the valve body.

7. A fluid mixing valve assembly comprising, valve chamber means having a plurality of inlet ports and an outlet port, displaceable passage means mounted within said chamber means and dimensionally reduced with respect thereto for presenting connecting passages in spaced relation to said inlet and outlet ports for fluid communication therebetween, sealing means fixedly received in said chamber means and removable with said displaceable passage means for movable support thereof in the chamber means, discharge means movably mounted on the chamber means to at least two spaced positions in which fluid flow from the outlet port may occur, and assembly means mounted on said chamber means for maintaining said displaceable passage means and the discharge means in pressure sealed assembled relation on the chamber means, said discharge means being operative in one of said two spaced positions to conduct discharge flow of fluid from the outlet port only if the chamber means is unsealed by the assembly means.

8. A plumbing fixture comprising, a valve body having a hemispherical cavity connected to one end of a cylindrical valve chamber having an opposite open end, inlet passages formed in said valve body in communication with said cavity and an outlet passage formed in said valve body in communication with said cylindrical chamber, a ball valve of a diameter less than said cavity and chamber disposed in said cavity and chamber and having external intersecting grooves structurally related for selective alignment with said inlet and outlet passages upon displacement of the ball valve in different directions, for establishing fluid communication therewith, means for preventing leakage between the ball valve and the valve body, an outlet member rotatably mounted on the valve body and removable therefrom having internal discharge passages selectively aligned with said outlet passage to conduct fluid discharge during both use and repair, means in one of said discharge passages for deflecting fluid discharge when aligned with the outlet passage as the outlet member is being removed, and pressure sealing assembling means mounted on said valve body for imposing sealing pressure on the ball valve member and the outlet member.

9. In a valve combination, a valve body having a cavity, a valve member removably received in said cavity by insertion in one direction, resilient seating means locked to the valve body within said cavity against movement in other directions, valve actuating means connected to said valve member for displacement thereof in said other directions, an outlet member movably mounted on said valve body, assembling means mounted on said valve body for exerting sealing pressure on the resilient seating means in said one direction to seal the cavity and passage means in said outlet member opened only when said assembling means is withdrawn from pressure sealing engagement with the resilient means to facilitate removal of the valve member and resilient seating means for repair purposes.

(References on following page)

References Cited by the Examiner

UNITED STATES PATENTS

| | | | |
|---|---|---|---|
| 1,489,709 | 4/24 | O'Flaherty | 137—605 |
| 1,532,745 | 4/25 | Hickerson | 137—605 |
| 1,614,437 | 1/27 | Cochran | 137—625.41 |
| 2,063,699 | 12/36 | Schellin | 251—317 |
| 2,117,456 | 5/37 | Schellin. | |
| 2,214,619 | 9/40 | Krieger | 137—605 |
| 2,535,580 | 12/50 | Kersten | 137—625.41 |
| 2,592,062 | 4/52 | Perry | 137—625.41 |
| 2,838,070 | 6/58 | Williams | 137—636.3 |
| 2,845,949 | 8/58 | Parker | 137—625.41 |
| 2,855,001 | 10/58 | Horne | 251—352 XR |
| 2,905,197 | 9/59 | Janes | 137—625.47 |
| 2,911,009 | 11/59 | Parker | 137—625.41 |
| 3,056,418 | 10/62 | Adams | 137—625.41 XR |

FOREIGN PATENTS

| | | |
|---|---|---|
| 162,697 | 3/49 | Austria. |
| 511,225 | 1/55 | Italy. |

MARTIN P. SCHWADRON, *Acting Primary Examiner*.

ISADOR WEIL, WILLIAM F. O'DEA, *Examiners*.